United States Patent
Hsueh et al.

(10) Patent No.: US 8,884,902 B2
(45) Date of Patent: Nov. 11, 2014

(54) DECORATIVE STRUCTURE FOR TOUCH SENSING DEVICE AND FABRICATION METHOD THEREOF

(75) Inventors: Fu-Yuan Hsueh, Taoyuan County (TW); Yung-Ming Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 145 days.

(21) Appl. No.: 13/572,365

(22) Filed: Aug. 10, 2012

(65) Prior Publication Data

US 2014/0043246 A1 Feb. 13, 2014

(51) Int. Cl.
*G09G 5/00* (2006.01)

(52) U.S. Cl.
USPC .......................... 345/173; 178/18.03; 359/601

(58) Field of Classification Search
CPC .......... G06F 2203/04103; G06F 3/041; G06F 3/0412; G06F 3/0416; G06F 3/0418; G02F 1/13338; G02F 1/133509; G02F 1/133512; G02F 1/133514
USPC .................. 345/173, 176; 178/18.03; 349/12; 359/601
See application file for complete search history.

(56) References Cited

U.S. PATENT DOCUMENTS

| 4,771,277 | A  | * | 9/1988  | Barbee et al. .................. 345/173 |
| 7,598,926 | B2 | * | 10/2009 | Hirata et al. ...................... 345/5 |
| 8,203,659 | B2 | * | 6/2012  | Chou ................................. 349/1 |
| 2004/0263670 | A1 | * | 12/2004 | Yamasaki ...................... 348/340 |
| 2009/0195739 | A1 | * | 8/2009 | Chang et al. .................... 349/110 |
| 2010/0182740 | A1 | * | 7/2010 | Arita .......................... 361/679.01 |
| 2011/0128114 | A1 | * | 6/2011 | Kimura et al. .................. 338/13 |

* cited by examiner

*Primary Examiner* — Tom Sheng
(74) *Attorney, Agent, or Firm* — Birch, Stewart, Kolasch & Birch, LLP

(57) ABSTRACT

A decorative structure for a touch sensing device is provided. The structure comprises a transparent substrate, a low diffusivity material layer and a protective layer. The transparent substrate has a non-touch surface having a non-image display area. The low diffusivity material layer is disposed on the non-touch surface of the transparent substrate and corresponds to the non-image display area, wherein the low diffusivity material layer has a reflectivity of less than 10%. The protective layer is disposed on the low diffusivity material layer and has at least a first opening pattern to allow a light to sequentially pass through the low diffusivity material layer and the transparent substrate from the first opening pattern.

36 Claims, 3 Drawing Sheets

DECORATIVE STRUCTURE FOR TOUCH SENSING DEVICE AND FABRICATION METHOD THEREOF

BACKGROUND OF THE INVENTION

1. Field of the Invention

The invention relates to a touch sensing device, and in particular, to light-shielding/decorative technology for a touch sensing device.

2. Description of the Related Art

A touch panel is capable of executing input functions through the use of fingers or a stylus, such that they are widely implemented in electronic products, such as laptops, tablets, and mobile phones. Typical touch panels are flat display devices having touch sensing devices, such as liquid crystal displays (LCD) or organic light-emitting displays (AMOLED).

Generally, a light-shielding/decorative layer, for example, black matrix (BM) layer, is disposed at the peripheral area (i.e. a non-image display area or a decorative area) of an image display area of a touch sensing device to provide light-shielding and decoration. The aesthetic design of electronic products usually has a direct influence on whether consumers like the electronic products or not. Therefore, in industry, light-shielding/decorative layers are now being fabricated in different colors to increase the color diversity and selectivity of electronic products and increase the purchasing intention of the consumers.

In order to increase the operational convenience of touch sensing devices for users, virtual function keys with specific patterns are usually disposed on non-image display areas having light-shielding/decorative layer. Users can identify the position and function of the virtual function keys by illuminating the described specific pattern from a backlight. However, light-shielding/decorative layers of different colors have different light penetration abilities and refractive characteristic. For example, due to light diffusion, a halo effect is induced for the virtual function keys on a white light-shielding/decorative layer and thus, the identification ability of the virtual function keys for users is reduced.

Accordingly, there exists a need in the art for development of a new light-shielding/decorative structure, capable of mitigating or eliminating the aforementioned problems.

BRIEF SUMMARY OF THE INVENTION

An exemplary embodiment of a decorative structure for a touch sensing device according to the invention is provided. The decorative structure comprises a transparent substrate, a low diffusivity material layer and a protective layer. The transparent substrate has a non-touch surface having a non-image display area. The low diffusivity material layer is disposed on the non-touch surface of the transparent substrate and corresponds to the non-image display area, wherein the low diffusivity material layer has a reflectivity of less than 10%. The protective layer is disposed on the low diffusivity material layer and has at least a first opening pattern to allow a light to sequentially pass through the low diffusivity material layer and the transparent substrate from the first opening pattern.

An exemplary embodiment of a method for fabricating a decorative structure for a touch sensing device according to the invention is provided. The method comprises providing a transparent substrate having a non-touch surface which has a non-image display area. A low diffusive material layer is formed on the non-touch surface corresponding to the non-image display area, wherein the low diffusive material layer has a reflectivity of less than 10%. A protective layer is formed on the low diffusive material layer, wherein the low diffusive material layer has at least a first opening pattern to allow a light to sequentially pass through the low diffusive material layer and the transparent substrate from the first opening pattern.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1:
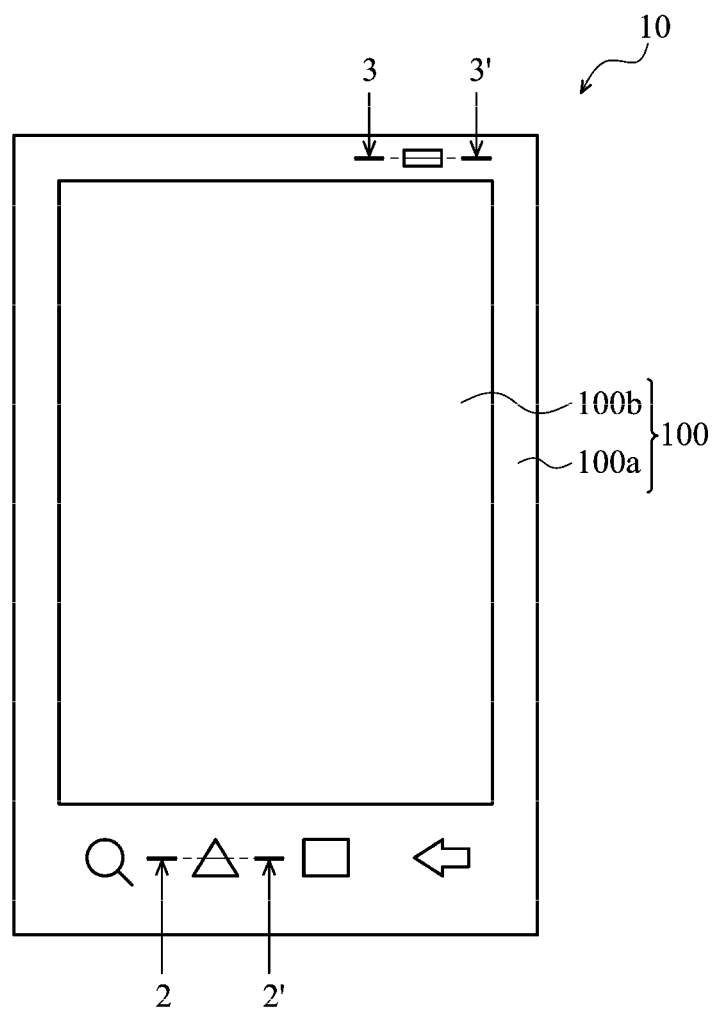
FIG. 1 is a plan view of an exemplary embodiment of a touch sensing device having a decorative structure according to the invention.
Figure 2:
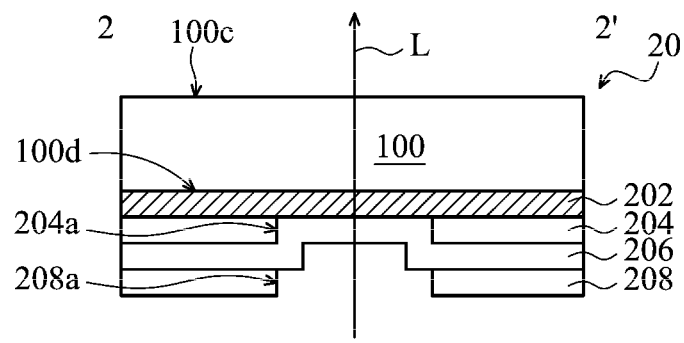
FIGS. 2 to 4 are cross-sectional views of various exemplary embodiments of decorative structures along the line 2-2' in FIG. 1 according to the invention.
Figure 6:
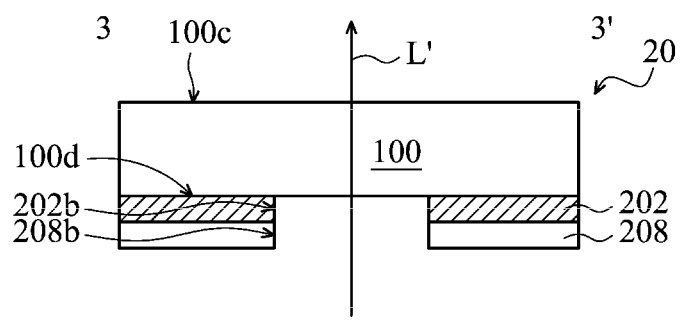

Referring to FIG. 1, a top view of an exemplary embodiment of a touch sensing device 10 having a decorative structure 20 (as shown in FIGS. 2 and 6) according to the invention is illustrated. In the embodiment, the touch sensing device 10 can be implemented in a mobile phone, but it is not limited thereto. The touch sensing device 10 can also be implemented in other electronic products having the touch panel, such as, a laptop, a tablet, a mobile phone, and so on. The touch sensing device 10 may comprise a transparent substrate 100. In one embodiment, the transparent substrate 100 is configured to provide a sensing surface and may comprise glass, quartz or other transparent materials. In the embodiment, the transparent substrate 100 has an image display area 100b and a non-image display area 100a. The non-image display area 100a is typically around the transparent substrate 100 and surrounds the image display area 100b.

The non-image display area 100a typically has the decorative structure 20 (as shown in FIGS. 2 and 6), so it is referred to as a decorative region. Further, the virtual function keys (the region along the line 2-2' as shown in FIG. 1) and/or the charging indication region (the region along the line 3-3' as shown in FIG. 1) are typically disposed on the non-image display area 100a. These regions are illuminated by a backlight (not shown), such that users can easily identify the positions and functions of the virtual function keys and the charging status.

Referring to FIG. 2, a cross-sectional view of an exemplary embodiment of a decorative structure along the line 2-2' in FIG. 1 and the fabrication method thereof are illustrated. The decorative structure 20 comprises a transparent substrate 100, and a low diffusivity material layer 202 and a protective layer 208 thereon. First, the transparent substrate 100, such as glass, is provided. The transparent substrate 100 has a touch surface (i.e. sensing surface) 100c and a non-sensing surface 100*d* opposite thereto. The non-sensing surface 100*d* has an image display region 100*b* and a non-image display area 100*a* (as shown in FIG. 1).

Next, a low diffusivity material layer 202 is disposed on the non-sensing surface 100*d* of the transparent substrate 100 and corresponds to the non-image display area 100*a* to expose the image display area 100*b* of the non-sensing surface 100*d*. In particular, in the embodiment, the low diffusivity material layer 202 has a reflectivity of less than 10%. In one embodiment, the low diffusivity material layer 202 may comprise transparent ink which may be formed on the transparent substrate 100 by coating or other suitable methods. The low diffusivity material layer 202 may have a thickness in a range of 2 μm to 3 μm.

In another embodiment, the low diffusivity material layer 202 may comprise poly(ethylene terephthalate) (PET) or triacetyl cellulose (TAC), and be formed on the transparent substrate 100 by deposition or other suitable methods. The low diffusivity material layer 202 may have a thickness greater than or equal to 100 μm.

Next, a protective layer 208 is disposed on the low diffusivity material layer 202 and has at least an opening pattern 208*a* to serve as a virtual function key region. It is noted that the opening pattern 208*a* may be any pattern and is not limited to the pattern shown in FIG. 1, and is based on the design demands. Further, a backlight (not shown) is typically disposed underlying the opening pattern 208*a* to allow a light L to sequentially pass through the low diffusivity material layer 202 and the transparent substrate 100 from the opening pattern 208*a*. In one embodiment, the protective layer 208 may comprise printing ink and be formed on the low diffusivity material layer 202 by printing, coating or other suitable methods. The protective layer 208 may have a thickness in a range of 5 μm to 50 μm.

In the embodiment, the decorative structure 20 further comprises decorative layers 204 and 206 disposed between the low diffusivity material layer 202 and the protective layer 208. For example, the decorative layer 204 having at least an opening pattern 204*a* corresponding to the opening pattern 208*a* is formed between the low diffusivity material layer 202 and the protective layer 208 before forming the protective layer 208. The decorative layer 204 may have a specific color to determine the color of the decorative region (i.e. the non-image display area 100*a*). In one embodiment, the decorative layer 204 may comprise printing ink and be formed on the low diffusivity material layer 202 by printing, coating or other suitable methods. The decorative layer 204 may have a thickness in a range of 5 μm to 50 μm.

Next, a decorative layer 206 is formed between the decorative layer 204 and the protective layer 208 and fills the opening pattern 204*a* of the decorative layer 204. The decorative layer 206 may have a specific color or be colorless to determine the color of the virtual function keys. In the embodiment, the materials and the fabrication methods of the decorative layer 206 may be the same as or similar to that of the decorative layer 204.

According to the foregoing embodiment, since the light L passing through the opening patterns 208*a* and 204*a* needs to pass through the transparent substrate 100 from the low diffusivity material layer 202, the effect of light diffusion is reduced by the low diffusivity material layer 202, thereby preventing the halo effect from occurring near the regions of the opening patterns 208*a* and 204*a*. Therefore, the identification of the virtual function keys for users is maintained or improved.

Figure 3:
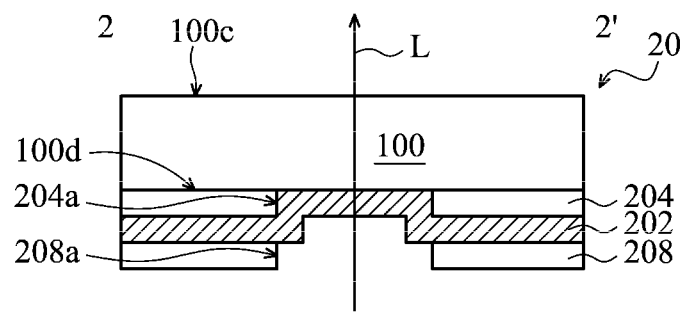

Referring to FIG. 3, a cross-sectional view of another exemplary embodiment of a decorative structure along the line 2-2' in FIG. 1 and the fabrication method thereof are illustrated. Elements in FIG. 3 that are the same as those in FIG. 2 are labeled with the same reference numbers as in FIG. 2 and are not described again for brevity. In the embodiment, the decorative structure 20 has a structure similar to that of the decorative structure shown in FIG. 2. Unlike the embodiment shown in FIG. 2, the decorative layer 204 having the opening pattern 204*a* is disposed between the transparent substrate 100 and the low diffusivity material layer 202. That is, the decorative layer 204 having at least one opening pattern 204*a* corresponding to the opening pattern 208*a* may be formed on the glass substrate 100 before forming the low diffusivity material layer 202. In the embodiment, the low diffusivity material layer 202 can be a decorative layer having a specific color or being colorless to determine the color of the virtual function keys. Therefore, the decorative layer 206 does not need to be formed (as shown in FIG. 2). Compared to the embodiment of FIG. 2, the process is further simplified.

According to the foregoing embodiment, since the light L passing through the opening patterns 208*a* and 204*a* need to pass through the transparent substrate 100 from the low diffusivity material layer 202, the halo effect is prevented from occurring in the regions near the opening patterns 208*a* and 204*a* due to the low diffusivity material layer 202. Therefore, the identification of the virtual function keys for users is maintained or improved.

Figure 4:
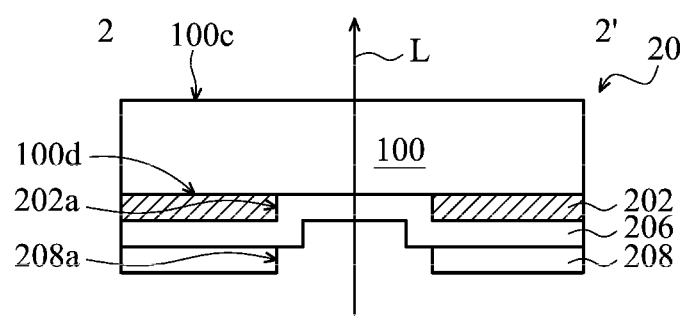

Referring to FIG. 4, a cross-sectional view of another exemplary embodiment of a decorative structure along the line 2-2' in FIG. 1 and the fabrication method thereof are illustrated. Elements in FIG. 4 that are the same as those in FIG. 2 are labeled with the same reference numbers as in FIG. 2 and are not described again for brevity. In the embodiment, the decorative structure 20 has a structure similar to that of the decorative structure shown in FIG. 2. Unlike the embodiment shown in FIG. 2, the low diffusivity material layer 202 has at least one opening pattern 202*a* corresponding to the opening pattern 208*a*, such that the decorative layer 206 is formed on the low diffusivity material layer 202 and fills the opening pattern 202*a*. In the embodiment, the low diffusivity material layer 202 may have a specific color or be colorless to determine the color of the decorative region (i.e. the non-image display area 100*a*). Therefore, the decorative layer 204 does not need to be formed (as shown in FIG. 2). Compared to the embodiment of FIG. 2, the process is further simplified.

According to the foregoing embodiment, the regions near the opening pattern 202*a* are prevented from the halo effect by the low diffusivity material layer 202. Therefore, the identification of the virtual function keys for users is maintained or improved.

Figure 5:
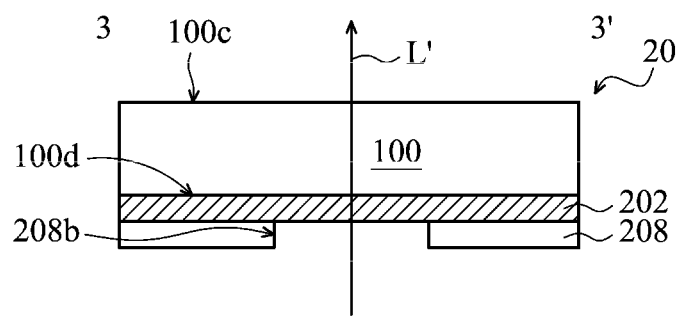
FIGS. 5 to 6 are cross-sectional views of various exemplary embodiments of decorative structures along the line 3-3' in FIG. 1 according to the invention.

Referring to FIG. 5, a cross-sectional view of another exemplary embodiment of a decorative structure along the line 3-3' in FIG. 1 and the fabrication method thereof are illustrated. Elements in FIG. 5 that are the same as those in FIG. 2 are labeled with the same reference numbers as in FIG. 2 and are not described again for brevity. In the embodiment, the protective layer 208 of the decorative structure 20 has at least one opening pattern 208*b* to serve as a charging indicator region. It is noted that the opening pattern 208*b* can be any pattern and is not limited to the pattern shown in FIG. 1, and is based on the design demands. Further, a backlight (not shown) is typically disposed underlying the opening pattern 208*b* to allow a light L' to sequentially pass through the low diffusivity material layer 202 and the transparent substrate 100 from the opening pattern 208*b*. In one embodiment, the materials and the fabrication methods of the protective layer 208 may be the same as or similar to the decorative layer 204 (as shown in FIG. 2) and be a specific color to determine the color of the decorative region (i.e. the non-image display area 100a). In another embodiment, a decorative layer (not shown) is formed between the low diffusivity material layer 202 and the protective layer 208 to determine the color of the decorative region.

According to the foregoing embodiment, since the light L' passing through the opening pattern 208a needs to pass through the transparent substrate 100 from the low diffusivity material layer 202, the halo effect is prevented from occurring in the regions near the opening pattern 208b due to the low diffusivity material layer 202. Therefore, the identification of the charging indicator region for users is maintained or improved.

Referring to FIG. 6, a cross-sectional view of another exemplary embodiment of a decorative structure along the line 3-3' in FIG. 1 and the fabrication method thereof are illustrated. Elements in FIG. 6 that are the same as those in FIG. 5 are labeled with the same reference numbers as in FIG. 5 and are not described again for brevity. In the embodiment, the decorative structure 20 has a structure similar to that of the decorative structure shown in FIG. 5. Unlike the embodiment shown in FIG. 5, the low diffusivity material layer 202 has at least one opening pattern 202b corresponding to the opening pattern 208a. In the embodiment, the low diffusivity material layer 202 may have a specific color or be colorless to determine the color of the decorative region (i.e. the non-image display area 100a). In one embodiment, the materials and the fabrication methods of the protective layer 208 may be the same as or similar to the decorative layer 204 (as shown in FIG. 2) and be a specific color to determine the color of the decorative region (i.e. the non-image display area 100a). In another embodiment, a decorative layer (not shown) is formed between the low diffusivity material layer 202 and the protective layer 208 to determine the color of the decorative region.

According to the foregoing embodiment, the halo effect is prevented from occurring in the regions near the opening pattern 202b due to the low diffusivity material layer 202. Therefore, the identification of the charging indicator region for users is maintained or improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A decorative structure for a touch sensing device, comprising:
a transparent substrate, having a non-touch surface which has a non-image display area;
a low diffusivity material layer, disposed on the non-touch surface of the transparent substrate and corresponding to the non-image display area to expose a portion of the non-touch surface outside of the non-image display area, wherein the low diffusivity material layer has a reflectivity of less than 10%; and
a protective layer, disposed on the low diffusivity material layer and having at least a first opening pattern to allow a light to sequentially pass through the low diffusivity material layer and the transparent substrate from the first opening pattern.

2. The decorative structure of claim 1, further comprising:
a first decorative layer, disposed between the low diffusivity layer and the protective layer, and having at least a second opening pattern corresponding to the first opening pattern; and
a second decorative layer, disposed between the first decorative layer and the protective layer, and filling the second opening pattern of the first decorative layer.

3. The decorative structure of claim 1, further comprising a first decorative layer, disposed between the transparent substrate and the low diffusivity material layer, wherein the first decorative layer has at least a second opening pattern corresponding to the first opening pattern, such that the low diffusivity material layer fills the second opening pattern of the first decorative layer to serve as a second decorative layer.

4. The decorative structure of claim 1, wherein the low diffusivity material layer has at least a second opening pattern corresponding to the first opening pattern to serve as a first decorative layer, and the decorative structure further comprises a second decorative layer disposed between the low diffusivity material layer and the protective layer and filling the second opening pattern of the low diffusivity material layer.

5. The decorative structure of claim 1, wherein the low diffusivity material layer comprises transparent ink.

6. The decorative structure of claim 5, wherein the low diffusivity material layer has a thickness in a range of 2 μm to 3 μm.

7. The decorative structure of claim 1, wherein the low diffusivity material layer comprises poly(ethylene terephthalate) (PET) or triacetyl cellulose (TAC).

8. The decorative structure of claim 7, wherein the low diffusivity material layer has a thickness greater than or equal to 100 μm.

9. The decorative structure of claim 1, wherein the low diffusivity material layer has at least a second opening pattern corresponding to the first opening pattern.

10. A method for fabricating a decorative structure for a touch sensing device, comprising:
providing a transparent substrate having a non-touch surface which has a non-image display area;
forming a low diffusivity material layer on the non-touch surface corresponding to the non-image display area to expose a portion of the non-touch surface outside of the non-image display area, wherein the low diffusivity material layer has a reflectivity of less than 10%; and
forming a protective layer on the low diffusivity material layer, wherein the low diffusivity material layer has at least a first opening pattern to allow a light to sequentially pass through the low diffusivity material layer and the transparent substrate from the first opening pattern.

11. The method of claim 10, further comprising:
forming a first decorative layer between the low diffusivity layer and the protective layer, wherein the first decorative layer has at least a second opening pattern corresponding to the first opening pattern; and
forming a second decorative layer between the first decorative layer and the protective layer, and filling the second opening pattern of the first decorative layer.

12. The method of claim 10, further comprising forming a first decorative layer between the transparent substrate and the low diffusivity material layer, wherein the first decorative layer has at least a second opening pattern corresponding to the first opening pattern, such that the low diffusivity material layer fills the second opening pattern of the first decorative layer to serve as a second decorative layer.

13. The method of claim 10, further comprising:
   forming at least a second opening pattern in the low diffusivity material layer to serve as a first decorative layer, wherein the second opening pattern corresponds to the first opening pattern; and
   forming a second decorative layer between the low diffusivity material layer and the protective layer and filling the second opening pattern of the low diffusivity material layer.

14. The method of claim 10, wherein the low diffusivity material layer comprises transparent ink.

15. The method of claim 14, wherein the low diffusivity material layer has a thickness in a range of 2 μm to 3 μm.

16. The method of claim 10, wherein the low diffusivity material layer comprises poly(ethylene terephthalate) (PET) or triacetyl cellulose (TAC).

17. The method of claim 16, wherein the low diffusivity material layer has a thickness greater than or equal to 100 μm.

18. The method of claim 10, wherein the low diffusivity material layer has at least a second opening pattern corresponding to the first opening pattern.

19. A decorative structure for a touch sensing device, comprising:
   a transparent substrate, having a non-touch surface which has a non-image display area;
   a low diffusivity material layer, disposed on the non-touch surface of the transparent substrate and corresponding to the non-image display area, wherein the low diffusivity material layer has a reflectivity of less than 10%;
   a protective layer, disposed on the low diffusivity material layer and having at least a first opening pattern to allow a light to sequentially pass through the low diffusivity material layer and the transparent substrate from the first opening pattern;
   a first decorative layer, disposed between the low diffusivity layer and the protective layer, and having at least a second opening pattern corresponding to the first opening pattern; and
   a second decorative layer, disposed between the first decorative layer and the protective layer, and filling the second opening pattern of the first decorative layer.

20. The decorative structure of claim 19, wherein the low diffusivity material layer comprises transparent ink.

21. The decorative structure of claim 20, wherein the low diffusivity material layer has a thickness in a range of 2 μm to 3 μm.

22. The decorative structure of claim 19, wherein the low diffusivity material layer comprises poly(ethylene terephthalate) (PET) or triacetyl cellulose (TAC).

23. The decorative structure of claim 22, wherein the low diffusivity material layer has a thickness greater than or equal to 100 μm.

24. The decorative structure of claim 19, wherein the low diffusivity material layer has at least a second opening pattern corresponding to the first opening pattern.

25. A decorative structure for a touch sensing device, comprising:
   a transparent substrate, having a non-touch surface which has a non-image display area;
   a low diffusivity material layer, disposed on the non-touch surface of the transparent substrate and corresponding to the non-image display area, wherein the low diffusivity material layer has a reflectivity of less than 10%;
   a protective layer, disposed on the low diffusivity material layer and having at least a first opening pattern to allow a light to sequentially pass through the low diffusivity material layer and the transparent substrate from the first opening pattern; and
   a first decorative layer, disposed between the transparent substrate and the low diffusivity material layer, wherein the first decorative layer has at least a second opening pattern corresponding to the first opening pattern, such that the low diffusivity material layer fills the second opening pattern of the first decorative layer to serve as a second decorative layer.

26. The decorative structure of claim 25, wherein the low diffusivity material layer comprises transparent ink.

27. The decorative structure of claim 26, wherein the low diffusivity material layer has a thickness in a range of 2 μm to 3 μm.

28. The decorative structure of claim 25, wherein the low diffusivity material layer comprises poly(ethylene terephthalate) (PET) or triacetyl cellulose (TAC).

29. The decorative structure of claim 28, wherein the low diffusivity material layer has a thickness greater than or equal to 100 μm.

30. The decorative structure of claim 25, wherein the low diffusivity material layer has at least a second opening pattern corresponding to the first opening pattern.

31. A decorative structure for a touch sensing device, comprising:
   a transparent substrate, having a non-touch surface which has a non-image display area;
   a low diffusivity material layer, disposed on the non-touch surface of the transparent substrate and corresponding to the non-image display area, wherein the low diffusivity material layer has a reflectivity of less than 10%;
   a protective layer, disposed on the low diffusivity material layer and having at least a first opening pattern to allow a light to sequentially pass through the low diffusivity material layer and the transparent substrate from the first opening pattern, wherein the low diffusivity material layer has at least a second opening pattern corresponding to the first opening pattern to serve as a first decorative layer; and
   a second decorative layer, disposed between the low diffusivity material layer and the protective layer and filling the second opening pattern of the low diffusivity material layer.

32. The decorative structure of claim 31, wherein the low diffusivity material layer comprises transparent ink.

33. The decorative structure of claim 32, wherein the low diffusivity material layer has a thickness in a range of 2 μm to 3 μm.

34. The decorative structure of claim 31, wherein the low diffusivity material layer comprises poly(ethylene terephthalate) (PET) or triacetyl cellulose (TAC).

35. The decorative structure of claim 34, wherein the low diffusivity material layer has a thickness greater than or equal to 100 μm.

36. The decorative structure of claim 31, wherein the low diffusivity material layer has at least a second opening pattern corresponding to the first opening pattern.

* * * * *